(12) United States Patent
Hirvonen et al.

(10) Patent No.: US 6,887,345 B2
(45) Date of Patent: May 3, 2005

(54) PROCESS AND DEVICE FOR EVAPORATING LIQUIDS, FOR EXAMPLE BLACK LIQUOR FROM CELLULOSE COOKING, WHICH CONTAIN SOLID AND DISSOLVED SUBSTANCES

(75) Inventors: Ismo Hirvonen, Tampere (FI); Randy Stern, Charlotte, NC (US)

(73) Assignee: Kvaerner Pulping AB, Karlstad (SE)

( * ) Notice: Subject to any disclaimer, the term of this patent is extended or adjusted under 35 U.S.C. 154(b) by 0 days.

(21) Appl. No.: 10/432,093

(22) PCT Filed: Nov. 20, 2001

(86) PCT No.: PCT/SE01/02559

§ 371 (c)(1),
(2), (4) Date: Sep. 22, 2003

(87) PCT Pub. No.: WO02/42552

PCT Pub. Date: May 30, 2002

(65) Prior Publication Data

US 2004/0107597 A1 Jun. 10, 2004

(30) Foreign Application Priority Data

Nov. 22, 2000 (SE) .............................................. 0004265

(51) Int. Cl.[7] .............................. B01D 1/22; D21C 11/10
(52) U.S. Cl. ...................... 159/47.3; 159/2.1; 159/26.1; 159/28.3; 159/43.1; 159/49; 159/DIG. 8; 159/DIG. 32; 162/30.11; 162/46
(58) Field of Search ............................ 159/23, 49, 2.1, 159/44, 26.1, 28.3, 28.1, 43.1, 901, DIG. 8, DIG. 32, 47.3, 13.1, 17.1, 16.3; 162/61, 62, 46, 30.11; 423/DIG. 3

(56) References Cited

U.S. PATENT DOCUMENTS

| 2,786,518 | A | * | 3/1957 | Johan ......................... 159/47.3 |
| 3,322,648 | A | * | 5/1967 | Kays et al. .................. 202/174 |
| 3,366,158 | A | * | 1/1968 | Rosenblad ................. 159/13.3 |
| 4,076,576 | A | * | 2/1978 | Marttala .................... 159/13.3 |
| 4,857,146 | A | | 8/1989 | Andersson |
| 5,624,531 | A | * | 4/1997 | Knuutila et al. ........... 159/13.3 |
| 5,716,496 | A | | 2/1998 | Agren |

OTHER PUBLICATIONS

Tubel, a New Black Liquor Concentrator Technology, Jun. 1, 1999, A. Wernqvist, Paper Given at 6th Int. Conf on New Avail. Technologies Stockholm, SE Jun. 1, 1999–Jun. 5, 1999.

* cited by examiner

Primary Examiner—Virginia Manoharan
(74) Attorney, Agent, or Firm—Rolf Fasth; Fasth Law Offices

(57) ABSTRACT

The present invention relates to a process and a device for evaporating liquids, for example black liquor from cellulose cooking, which contain solid and dissolved substances which are to be concentrated. The liquid is heated to close to boiling temperature in a heat exchanger (1) of the falling-film type. The process is characterized in that the pressure on the liquid side in the falling-film heat exchanger (1) is kept so high that boiling does not take place in this heat exchanger and in that the evaporation takes place, by means of flashing, in a separate expansion tank (7) that has a lower steam.

15 Claims, 3 Drawing Sheets

= Liquid phase

= Heating media

= Liquid vapour phase

PROCESS AND DEVICE FOR EVAPORATING LIQUIDS, FOR EXAMPLE BLACK LIQUOR FROM CELLULOSE COOKING, WHICH CONTAIN SOLID AND DISSOLVED SUBSTANCES

PRIOR APPLICATION

This application is a U.S. national phase application based on International Application No. PCT/SE01/02559, filed 20 Nov. 2001, claiming priority from Swedish Patent Application No. 004265-5, filed 22 Nov. 2000.

TECHNICAL FIELD

The present invention relates to a process and a device for evaporating liquids, in particular black liquor from cellulose cooking. This liquid contains organic material which has been released from the wood, in particular lignin residues in the form of released lignin, hemicellulose and chemicals which have been added on account of the cooking. The substances are present in the form of solid particles and as dissolved substances. The purpose of the evaporation is to concentrate the dissolved and solid substances so that they can subsequently be combusted in what is termed a recovery boiler, if the liquid is a black liquor.

STATE OF THE ART

It is usual, and has been known for a very long time, to evaporate liquids which contain organic substances or chemicals in order to be able to combust the residue, and thereby generate heat, and to be able to recover the inorganic chemicals. This technique is particularly well developed in association with evaporating black liquor from cellulose cooking. Such an evaporation takes place in several stages in several evaporation appliances termed effects, with the most dilute black liquor being fed into one effect in order to be fed onwards in subsequent effects, with the concentration of the black liquor increasing as the black liquor is evaporated using steam which is frequently conducted in a combination of cocurrent and counter-current directions relative to the direction taken by the liquor. An example of a standard coupling of the effects is that the liquor goes in the sequence 456321 if the steam has the sequence 123456. The effects are normally numbered by the direction of flow of the steam determining the number sequence. The steam which is released from the liquor in one effect is used for evaporation in the subsequent effect. In the case of the highest concentrations, the pressure on both the steam side and the liquor side increases as the concentration increases, which means that the temperatures increase the more concentrated the liquor becomes. The finished product usually has a dry substance content of 70–80% and can therefore be combusted in a recovery boiler.

The appliance which is used for such an evaporation normally consists of tall, vertical cylinders which are provided internally with a heating surface consisting of either pipes or lamellae, through which the heating steam is caused to flow, with the liquor being caused to flow on the outside as a falling film. In this way, an open communication is obtained on the liquor side transversely to the direction of flow of the liquor. The heating by means of the heating surface evaporates the liquor, which is removed at the bottom part of the effect, with a part of the liquor being circulated and a part being conveyed onwards to the next effect.

In certain evaporators possessing vertical pipes, the liquor is caused to flow inside the pipes and the steam to surround the pipes, instead of the other way round, with this consequently giving rise to a closed communication on the liquor side transversely to the direction of flow of the liquor.

In falling-film evaporations, all the evaporation from the film broadly speaking takes place instantaneously. SE-C-504232 presents a falling-film evaporator in which the liquor flows on the outside of horizontal pipes, which pipes are heated by aqueous steam. As the liquor film falls downwards, it is concentrated, with the emission of liquor vapour, which liquor vapour is led away via an outlet. In this case, the liquor is therefore flashed (decompressed) in the evaporator. A similar falling-film evaporator is also presented in SE-C-512959, where this falling-film evaporator has been provided with an improved system for distributing the aqueous steam to the pipes. In both these evaporators, the concentration of the liquor is increased successively in the falling-film evaporator. An improved falling-film evaporator is presented in U.S. Pat. No. 5,624,531, in which the pipes are arranged vertically instead, whereupon the black liquor forms a film on the outside of the pipes. This type of evaporator has been installed extensively in black liquor-evaporation lines and is marketed by Kvaerner Pulping AB under the trade name TUBEL™. In this case, too, evaporation from the liquor film takes place continuously and liquor steam is extracted via the upper outlet at the top. Evaporation-concentrated black liquor is withdrawn at the bottom.

A type of evaporator is also what is termed a forced-circulation evaporator in which a liquor stream is first heated up in vertical or horizontal tubular heat exchangers, with the liquor in closed communication on the inner side of the tubes, thereby causing the temperature of the liquor to increase. The actual evaporation only takes place, by means of flashing, in a subsequent expansion tank having a lower steam pressure.

U.S. Pat. No. 4,857,146 presents a final evaporation stage in which the liquor is conducted, in a pressurized state, to a heat exchanger such that no boiling takes place in the heat exchanger. Only after the heating in the heat exchanger is the pressure lowered in a decompression tank (flash tank) to a level below the prevailing saturation pressure of the liquor. In this case, use is made of a conventional heat exchanger in which the liquor side is completely filled.

U.S. Pat. No. 5,112,441 presents a combination of a conventional evaporation stage in which evaporation down to 65% dry substance content takes place in the evaporation stage (the concentrator), with steam being blown off from the stage, with this being followed by a subsequent decompression of the liquor in a flash tank down to a lower, but nevertheless pressurized, level. In this case, evaporation thus takes place in two stages, firstly in the evaporator and then in a flash tank, but nevertheless while retaining a certain pressure.

A number of other different constructions and plants which are based on these principles are well known within the technical field.

THE TECHNICAL PROBLEM

Since the liquid which is intended for evaporation contains a large proportion of solid and dissolved substances, the problem exists that some of the contents of the liquid can become deposited on the walls in or on the pipes or lamellae. This so-called incrustation usually arises as a result of the crystallization of dissolved salts on the heating surfaces. An aggravating factor is when so-called nuclear boiling takes place directly in association with the heating surface, since this boiling can give rise locally to very high concentrations of solid or dissolved substances.

No nuclear boiling, or only very little nuclear boiling, will take place at the heating surfaces in forced-circulation appliances having liquid/liquor sides which are completely filled with liquid/liquor and in which all the evaporation takes place in a subsequent separation space. This a positive factor from the point of view of incrustation. However, these appliances have a limited capacity to increase the temperature of the liquor when the liquor volumes are relatively large in relation to the heating surfaces.

In the falling-film technique, the heating surface and the separation space are constructed as one unit, which provides a very efficient construction, which is also characterized by a very efficient use of the heating surfaces due to its high heat transfer values even at a lower electricity consumption than in the case of the forced-circulation technique. In the falling-film technique, the temperature of the liquor can be increased rapidly since the liquor volumes are relatively small in relation to the heating surfaces. However, in a falling-film evaporator, it is not possible to avoid nuclear boiling at the heating surface in association with a relatively high heat load, something which makes this technique more susceptible to incrustation than is the forced-circulation technique.

That which is most characteristic of the falling-film heat exchanger is that the film constitutes a relatively small part of the volume on the liquid side, i.e. substantially less than 40% of the total volume on the liquid side, normally less than 20% of the volume. The black liquor forms a thin film, typically 1–2 mm thick, on the heating surfaces. In this way, the volumes of the liquid which have to be heated can be reduced relative to the heat-transferring surfaces, resulting in the film on the heating surfaces being heated rapidly. It is this effect which has hitherto been exploited in falling-film evaporators for black liquor, in which the black liquor undergoes rapid evaporation as the film of liquor runs down over the heating surfaces. The remaining part of the total volume on the liquid side is taken up by gas phase (including liquor vapour).

The consequences of a possible incrustation are very serious both in the case of forced-circulation evaporation and in the case of falling-film evaporation in conventional tube appliances, both of which operate with the liquor in closed communication on the inside of the tubes, since a plugged tube cannot be washed clean during operation by means of simply lowering the concentration; instead, the plugged appliance has to be shut down for mechanical cleaning, resulting in a disturbance of production. In modern falling-film evaporators of the lamella type or of the tube element type (with the falling film on the outside of the tubes), both of which have open communication on the liquor side, this problem is counteracted by arranging for the concentration to be lowered during ongoing operation, a procedure which will dissolve any incrustation which has formed.

By means of its construction, with the heating steam inside the tubes, a falling-film evaporator of the tube element type is a favourable mechanical construction, especially at relatively high steam pressures.

While the falling-film technique affords a more efficient evaporation appliance, with lower electrical energy consumption and better washing capacity, it has a higher rate of incrustation than does the forced-circulation technique, at least at relatively high heat loading.

THE SOLUTION

That which is characteristic of the invention is that use is made of a falling-film heat exchanger in which, in contrast to known technique, boiling, and thus continuous evaporation in the thin film in the falling-film heat exchanger, is avoided. By means of pressurizing the liquor vapour on the liquor side to a pressure which is well above the saturation pressure for the liquor at its prevailing temperature, the boiling can be efficiently suppressed and the incrustation problems avoided.

According to the present invention, a process for evaporating liquids, for example black liquor from cellulose cooking, containing solid and dissolved substances which are to be concentrated has been developed for the purpose of overcoming the above-mentioned problems, in which process the liquid in a falling-film heat exchanger of, for example, the tube of lamella type is heated to the vicinity of the boiling temperature. The invention also relates to a device for evaporating liquids.

According to the invention, use if preferably made of a falling-film technique of the tube element type (TUBEL™) or lamella type, both of which have the falling liquor film on the outside of the tubes or lamellae.

According to the invention, preference is given to the pressure on the liquid vapour on the liquid side in the falling-film heat exchanger continuously corresponding to, or exceeding, the saturation pressure for the liquid when operation has become established, and corresponding to, or exceeding, the saturation pressure for the water in the liquid during black liquor evaporation, and, preferably, to this being more than 0.1 bar above the saturation pressure for the liquid, i.e. the pressure at which the liquid would boil at the highest temperature prevailing in the falling-film heat exchanger, preferably at least 0.5 bar above the saturation pressure. There should be substantially no continuous extraction of liquid vapour from the liquid side. This makes it possible to efficiently suppress nuclear boiling in the black liquor in the falling-film heat exchanger.

According to the invention, the liquid is heated using a heating medium in the form of steam under pressure.

According to a preferred example of the present invention, the pressure on the heating side in the falling-film heat exchanger is approx. 3.6 bar and the temperature is approx. 140° C., while the pressure on the liquid vapour on the liquid side in the falling-film heat exchanger is approx. 2 bar and the temperature 134° C., with the pressure in the expansion tank being approx. 1.5 bar, with the temperature of the liquid being cooled down to approx. 130° C. during intense flashing.

DESCRIPTION OF THE FIGURES

The invention will be described in more detail below with reference to the attached figures in which.

DETAILED DESCRIPTION

Figure 1:
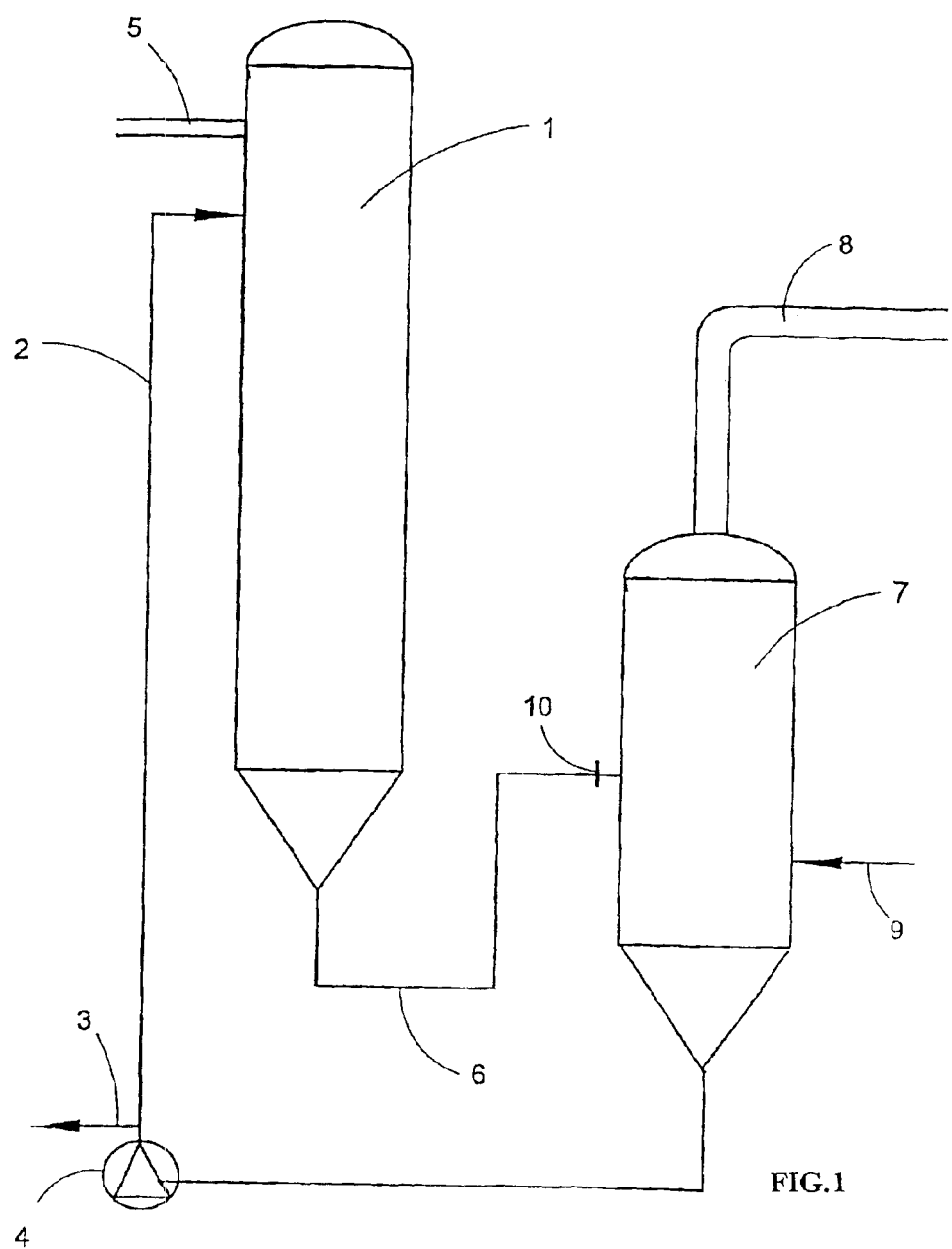
FIG. 1 shows an outline diagram of an appliance which is used in association with the present invention.

FIG. 1 shows a falling-film evaporation appliance, i.e. what is termed an effect 1, of conventional construction. This effect can possess lamellae or pipes in its interior, through or on which the liquid which is intended for evaporation flows. The liquid is fed in via the pipe 2, and this liquid principally consists of previously evaporated, circulating liquid. Some of this liquid, which may be ready for combusting or which is to be fed to another effect, is withdrawn through pipe 3. The circulation is brought about using a pump 4. The heating medium, i.e. the steam which is to impart to the liquid, which enters through the pipe 2, the requisite temperature for evaporation, is fed in through the pipe 5. While this steam can be what is termed primary steam, it can also come from a preceding effect.

The liquid which has been caused to flow through the effect 1 is removed at the bottom of the effect through the pipe 6 and fed through a pressure reduction valve 10 into the expansion vessel 7, which is at a lower pressure than that which corresponds to the pressure at which the liquid coming through the pipe 6 boils. Intensive boiling will therefore take place in the expansion tank 7, with the liquid being cooled down and vapour being formed, which vapour is removed through the pipe 8. The liquid which has been concentrated by evaporation is removed from the lower part of the expansion tank 7 and caused to circulate through the pipe 2 or conducted out through the pipe 3. Fresh liquid which is to be concentrated is fed through the pipe 9 into the expansion vessel 7 and caused to mix with the liquid which has been concentrated by evaporation in the expansion tank 7.

The figure only shows the apparatus which is required in accordance with the present invention diagrammatically. The invention can be applied to all the effects in a plant, if so desired, and these effects can be of any type whatsoever. That which is important is that nuclear boiling is prevented in the effect 1 and that the evaporation as such takes place in the expansion tank 7.

Figure 2:
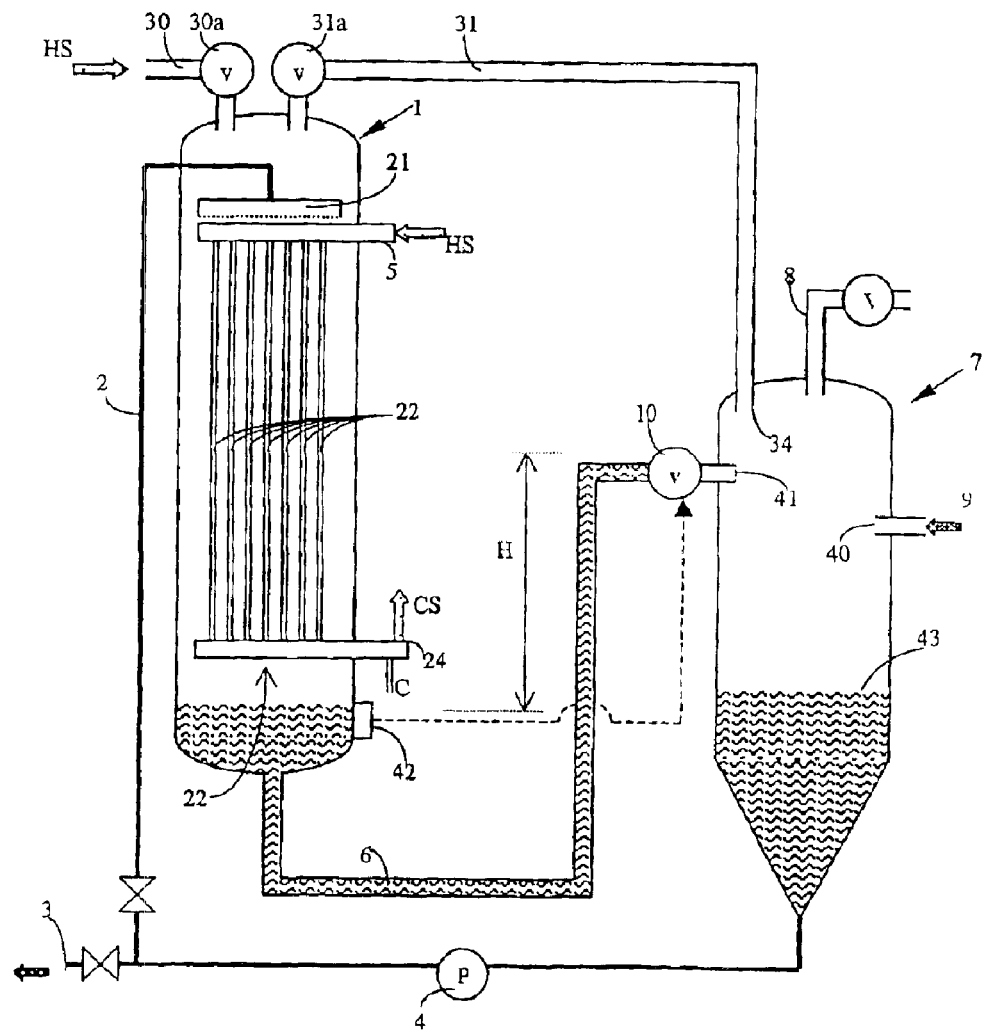
FIG. 2 shows a more detailed variant of FIG. 1.

FIG. 2 shows an advantageous variant in which the components/parts which have a corresponding function to those shown in FIG. 1 have the same reference number. In this figure, the falling-film heat exchanger 1 is shown with its assembly of vertical tubes 22. A heating medium, i.e. heating steam HS, flows through the tubes, i.e. via the inlet 5, and thence to distribution boxes and out into the tubes 22, and residual steam CS is ventilated via the outlet 24. Condensate C which has formed is tapped off from the lowest point in the system. The construction resembles that which is presented in U.S. Pat. No. 5,624,531.

Figure 3:
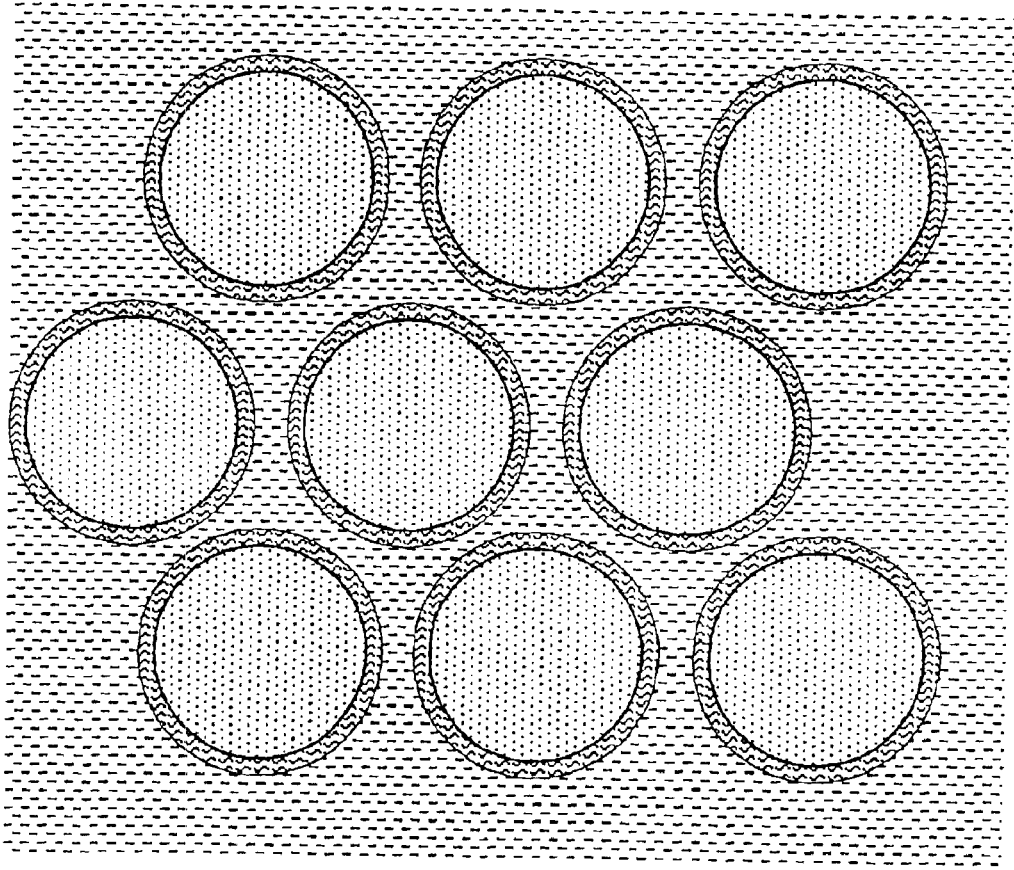
FIG. 3 shows how the liquid is distributed as a film in the falling-film heat exchanger.
Figure 3:
Figure 3:
Figure 3:

The liquor which is to be heated on the liquid side is fed in via an element 21 which is placed at a high level, for distributing the liquid. The distribution element can consist of a box with holes in the bottom from which the liquid drops down over the tube assembly. The liquid/liquor then forms a falling film of liquid over heating surfaces, which are heated by the heating medium, on the outside of the tubes. The way in which this film is formed is shown in FIG. 3, in which a number of tubes, through which heating media SF flow, are seen in cross section, and in which the film LF is formed on the outside of the tubes, on a liquid side which is otherwise filled with a liquid vapour GF.

If there is a need to be able to establish the requisite pressure on the liquid vapour on the liquid side already at start-up, means are then required for supplying pressurized steam. This is obtained via a feed line 30 for pressurizing steam HS, expediently the same steam as used for the heating medium, which steam pressurizes the liquid vapour phase on the liquid side via a pressure control valve 30a. By means of supplying pressure in this way, it is possible to already establish the requisite pressure on the liquid side when starting up from the falling-film heat exchanger being in a cold state. In certain applications in which the equipment is run continuously, the pressurization can in this way be dispensed with since the requisite pressure is built up during start-up and, when the operation has become established (what is termed the steady state), this pressure is then maintained due to the heating medium being supplied continuously.

While the falling-film heat exchanger is not intended to give rise to any boiling of the liquid on the liquid side, temperatures which are too high can be obtained on the heating side in connection with certain operational states, a situation which can give rise to pressures which are too high. If the liquid contains other non-condensable gases which are more readily volatile than water, for example air or nitrogen, a certain overpressure can also be established. It is possible, via a decompression valve 31a in an outlet line 31, to ventilate away any possible overpressure intermittently from the liquid vapour phase on the liquid side to the decompression tank 7, expediently by way of an inlet 34 above the liquid level 43 in the tank 7. Due to the equilibrium existing between water in the liquid vapour phase on the liquid side and the liquid phase, some water will always be present in the liquid vapour phase. Even if some of the liquid vapour phase has to be ventilated due to the overpressure which has developed, only a negligibly small part of the water will accompany this ventilated vapour, i.e. substantially less than 1% of the water content of the integral black liquor, and typically of the order of size of a few parts per thousand of the water content in the integral black liquor. Consequently, substantially more than 97%, typically more than 99%, of the water content in the integral black liquor should be retained by the falling-film heat exchanger. The liquid which is pressurized and heated in the falling-film heat exchanger is conducted to the decompression tank 7, by way of the pipe 6, the pressure reduction valve 10 and an inlet 41, which inlet is arranged above the water level 43 formed in the tank, with decompression of the liquid taking place in the gas phase. The pressure reduction valve 10 is controlled using a liquid level transmitter 42 such that a certain liquid level is maintained in the falling-film heat exchanger or at least in the falling-film heat exchanger's outlet pipe 6 for the pressurized and heated liquid. The liquid level is established at a level which is suitable for ensuring that there is no risk of the pressure in the falling-film heat exchanger blowing out in the tank 7.

Fresh liquid which is to be evaporated is conducted into the system via the decompression tank 7, by way of the pipe 9 and an inlet 40 which is arranged above the liquid level 43 which is formed in the tank, with the fresh liquid, which is at a lower temperature and a lower concentration, firstly being heated in the gas phase of the decompression tank by means of direct heat exchange. Expediently, the fresh liquid is conveyed into the gas phase by way of some type of spray/atomizer (not shown). This results in a first heating of the fresh liquid in the gas phase of the tank, with a first degree of incrustation thereby being obtained in a manner which is directed towards the tank 7, and not being obtained in the falling-film heat exchanger. What is substantially a deliberate formation of any possible incrustations is obtained in the tank 7, thereby considerably reducing the risk of incrustation formation in the falling-film heat exchanger.

In order for the present invention to have a particularly good effect, it is possible to increase the rate of circulation very substantially as compared to what is usual in a conventional falling-film appliance, i.e. to what is two to five times the normal rate.

An example of the actual conditions in the appliance, which can be a falling-film evaporator with liquid flowing on the outside of the pipes, is that the pressure of the steam which enters through the pipe 5 is approx. 3.6 bar, while its temperature is 140° C. In this connection, the pressure on the liquid which is entering through the pipe 2 and which is caused to flow on the outside of the vertical pipes in the effect 1 can be approx. 2 bar while the liquid has a temperature of approx. 134° C. This liquid, which is to be partially volatilized in the expansion tank 7, is admitted into this tank against a steam pressure of approx. 1.5 bar, that is a pressure which is approx. 0.5 bar lower than in the effect 1, with vapour being released rapidly while the liquid cools down to approx. 130° C. The abovementioned approximate figures for pressure and temperature are also intended to include deviations within the range +/−10%.

Apart from saving the costs involved in repeated interruptions to production, an advantage of the present invention is that the heating areas can be made much smaller since there is no need to allow for impurities. This represents a substantial economy. The invention also makes it possible to have fewer sections and fewer circulation rounds, with this too leading to economies as a result of fewer instruments, pumps and control valves. In certain cases, automatic washing valves can also be dispensed with.

While the pressure difference between the pressure in the expansion tank 7 and the liquid side in the effect 1 is expediently less than 1 bar, an upper limit is only specified for practical reasons.

The invention is not limited to the embodiment shown; on the contrary, it can be varied in different ways within the scope of the patent claims. For example, the pressurizing 30, 30a can be omitted if the falling-film heat exchanger is essentially run continuously and the start-up procedure takes place rapidly. The pressure difference between the liquid side and the decompression tank 7 can also be obtained using a fixed throttle 10, with the difference in height H being established for the purpose of obtaining a suitable pressure difference and the throttle being adjusted so that no boil-off takes place in the pipe 6. Any overpressure in the falling-film heat exchanger can also be regulated by controlling the flow of the heating medium HS. In that case, any possible overpressure valves can only be introduced as an additional secondary safety measure, where the primary control takes place by way of the flow of heating medium.

What is claimed is:

1. A process for evaporating a liquid from cellulose cooking, comprising:
    heating the liquid in an indirect falling-film heat exchanger, the heat exchanger having a heating side and a liquid side, the heating side being entirely filled with a heating medium; distributing the liquid on the liquid side over heating surfaces that are being heated by the heating medium; the liquid disposed on the heating surfaces forming a thin film over the heating surfaces, the thin film of liquid occupying less than 40% of a volume on the liquid side, filling a remainder of the volume on the liquid side with a vapor;
    maintaining the vapor with a first pressure that is sufficiently high to prevent boiling of the liquid on the liquid side;
    transferring the pressurized liquid to a separate expansion tank;
    providing the expansion tank with a second pressure that is lower than the first pressure; and
    permitting the liquid disposed in the expansion tank to evaporate.

2. The process according to claim 1 wherein the process further comprises providing the heat exchanger with tubular elements.

3. The process according to claim 1 wherein the process further comprises providing the heat exchanger with lamellar elements.

4. The process according to claim 1 wherein the process further comprises maintaining the first pressure at or above a saturation pressure for the liquid to prevent boiling of the liquid.

5. The process according to claim 4 wherein the process further comprises maintaining the first pressure more than 0.1 bar above the saturation pressure.

6. The process according to claim 4 wherein the process further comprises maintaining the first pressure more than 0.5 bar above the saturation pressure.

7. The process according to claim 1 wherein the process further comprises heating the liquid with steam under pressure.

8. The process according to claim 1 wherein the process further comprises providing the heating medium with a pressure of about 3.6 bar and a temperature of about 140° C. and maintaining the first pressure of the liquid vapor at about 2 bar and a temperature of about 134° C. and maintaining the second pressure in the expansion tank at a pressure of about 1.5 bar and cooling the liquid down to a temperature of about 130° C.

9. A device for evaporating a liquid, comprising:
    an indirect heat exchanger having a heating side and a liquid side;
    the heating side having an inlet defined therein for a heating medium and an outlet defined therein for a heating medium;
    the liquid side being provided with a distributing element being disposed at a high level on the liquid side for distributing the liquid;
    the distributing element being arranged to distribute the liquid as a falling film over heating surfaces that are being heated by the heating medium;
    the falling film taking up less than 40% of a total volume of the liquid side;
    the liquid side of the heat exchanger having an outlet conduit being disposed at a low level that is below the high level of the distributing element;
    the outlet conduit being filled with the liquid;
    a remainder of the total volume of the side being filled with a vapor;
    pressure means for pressurizing the vapor on the liquid side to a pressure exceeding a saturation pressure of the liquid on the liquid side to suppress a boiling of the liquid;
    a throttle in operative engagement with the outlet conduit; and
    a decompression tank connected to the outlet conduit for permitting the liquid to boil and evaporate in the tank by decompression via the throttle.

10. The device according to claim 9 wherein a feed line is connected to the heat exchanger for providing a heating steam to pressurize the vapor and a pressure control valve is in operative engagement with the feed line.

11. The device according to claim 9 wherein an outlet line is connected to the heat exchanger and a decompression valve is in operative engagement with the outlet line to ventilate overpressure from the heat exchanger to the decompression tank.

12. The device according to claim 9 wherein the device has means for maintaining a liquid level in the decompression tank and the decompression tank has an inlet defined therein, the inlet being disposed above the liquid level.

13. The device according to claim 12 wherein the decompression tank has an inlet defined therein, the inlet being located above the liquid level in the decompression tank.

14. A process for evaporating a liquid from cellulose cooking, comprising:

feeding the liquid to an indirect falling film heat exchanger;

heating the liquid in the indirect falling-film heat exchanger, the heat exchanger having a heating side and a liquid side, the heating side being entirely filled with a heating medium;

distributing the liquid on the liquid side over heating surfaces that are being heated by the heating medium;

the liquid disposed on the heating surfaces forming a thin film over the heating surfaces, the thin film of liquid occupying less than 40% of a volume on the liquid side, filling a remainder of the volume on the liquid side with a vapor;

maintaining the vapor with a first pressure that is sufficiently high to prevent boiling of the liquid on the liquid side;

transferring the pressurized liquid to a separate expansion tank;

providing the expansion tank with a second pressure that is lower than the first pressure; permitting the liquid disposed in the expansion tank to evaporate;

circulating a first portion of the evaporated liquid in a circulation conduit from the expansion tank back to the indirect falling film heat exchanger; and withdrawing a second portion of the evaporated liquid to an evaporation effect unit.

15. A process for evaporating a fresh liquid from cellulose cooking, comprising:

feeding the fresh liquid to be evaporated to an expansion tank having a liquid disposed therein;

mixing the fresh liquid with the liquid in the expansion tank to form a liquid mixture;

feeding a portion of the liquid mixture to an indirect falling film heat exchanger;

heating the liquid mixture in the indirect falling-film heat exchanger, the heat exchanger having a heating side and a liquid side, the heating side being entirely filled with a heating medium;

distributing the liquid mixture on the liquid side over heating surfaces that are being heated by the heating medium; the liquid mixture disposed on the heating surfaces forming a thin film over the heating surfaces, the thin film of liquid occupying less than 40% of a volume on the liquid side, filling a remainder of the volume on the liquid side with a vapor;

maintaining the vapor with a first pressure that is sufficiently high to prevent boiling of the liquid mixture on the liquid side;

transferring the heated and pressurized liquid mixture to the expansion tank;

providing the expansion tank with a second pressure that is lower than the first pressure;

permitting the pressurized liquid mixture to expand and evaporate in the expansion tank;

circulating a first portion of the liquid mixture in a circulation conduit from the expansion tank back to the indirect falling film heat exchanger; and withdrawing a second portion of the liquid mixture to an evaporation effect unit.

* * * * *